United States Patent [19]

König et al.

[11] 4,426,487
[45] Jan. 17, 1984

[54] MIXTURES OF NCO PREPOLYMERS CONTAINING TERTIARY NITROGEN ATOMS AND THE USE THEREOF AS ADHESIVES OR COATINGS

[75] Inventors: Eberhard König, Kronberg; Rudolf Hombach, Leverkusen; Manfred Dollhausen, Odenthal; Josef Pedain, Cologne, all of Fed. Rep. of Germany

[73] Assignee: Bayer Aktiengesellschaft, Leverkusen, Fed. Rep. of Germany

[21] Appl. No.: 424,924

[22] Filed: Sep. 27, 1982

[30] Foreign Application Priority Data

Oct. 8, 1981 [DE] Fed. Rep. of Germany ....... 3139967

[51] Int. Cl.$^3$ ............................................. C08L 75/12
[52] U.S. Cl. .................................. 524/710; 524/874; 528/59
[58] Field of Search ............... 524/710, 874, 875, 590, 524/140; 528/59, 51; 525/440

[56] References Cited

U.S. PATENT DOCUMENTS

| | | | |
|---|---|---|---|
| 3,317,481 | 5/1967 | Youker | 528/44 |
| 3,394,165 | 7/1968 | McClellan | 528/59 |
| 3,401,137 | 9/1968 | Finelli | 524/710 |
| 3,449,256 | 6/1969 | Farrissey et al. | 524/710 |
| 3,494,896 | 2/1970 | Aoke et al. | 528/59 |
| 3,496,144 | 2/1970 | Kunde | 528/59 |
| 3,600,358 | 4/1971 | Taub | 528/59 |
| 3,644,457 | 2/1972 | König et al. | 528/59 |
| 4,060,509 | 11/1977 | Olstowski | 524/710 |
| 4,260,717 | 4/1981 | Ehrhart | 528/59 |
| 4,279,800 | 7/1981 | Boomgaard et al. | 525/440 |
| 4,322,327 | 3/1982 | Yoshimura et al. | 525/440 |
| 4,383,070 | 5/1983 | Markush et al. | 524/874 |

FOREIGN PATENT DOCUMENTS

| | | |
|---|---|---|
| 534054 | 12/1956 | Canada ............................... 524/710 |
| 15465 | 9/1980 | European Pat. Off. . |
| 1922626 | 11/1970 | Fed. Rep. of Germany . |
| 1126094 | 9/1968 | United Kingdom . |

Primary Examiner—C. Warren Ivy
Attorney, Agent, or Firm—Gene Harsh; Lawrence S. Pope; Thomas W. Roy

[57] ABSTRACT

This invention relates to a mixture which is stable in storage in the absence of moisture and comprises the following:

(a) polyurethane prepolymers containing incorporated tertiary nitrogen atoms, structural units corresponding to the following formula:

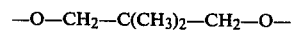

$$-O-CH_2-C(CH_3)_2-CH_2-O-$$

and terminal isocyanate groups,
(b) aromatic or aliphatic orthophosphoric acid esters;
(c) one or more inert solvents, and
(d) optionally other auxiliaries and additives, and to the use of these mixtures as adhesives or coatings for flexible or rigid substrates.

3 Claims, No Drawings

MIXTURES OF NCO PREPOLYMERS CONTAINING TERTIARY NITROGEN ATOMS AND THE USE THEREOF AS ADHESIVES OR COATINGS

BACKGROUND OF THE INVENTION

1. Field of the Invention

This invention relates to new mixtures of certain polyurethane prepolymers containing tertiary amino nitrogen atoms and aromatically-bound isocyanate groups with certain auxiliaries and additives, which mixtures, are on the one hand, effectively storable in the absence of moisture and, on the other hand, harden extremely quickly under the influence of atmospheric moisture. The present invention also relates use of these prepolymers as adhesives or coatings for various flexible or rigid substrates.

2. Description of the Prior Art

Polyurethane prepolymers having aromatically-bound isocyanate groups and incorporated tertiary amino nitrogen atoms are very labile systems when viewed chemically because they are extremely reactive due to the incorporated catalyst. On the other hand, such systems are of considerable practical interest as a one-component system, for example as an adhesive or coating due to the simple processibility thereof. However, the one-component systems known hitherto, based on NCO prepolymers having incorporated tertiary amino nitrogen atoms have not yet been successful, particularly in the adhesive sector, because they have not yet been able to satisfy adequately the practical expectations with respect to physiological safety, good storability and short gel times.

Thus, solutions of aromatic polyisocyanates, inter alia, of NCO prepolymers containing tertiary nitrogen atoms, in certain solvents containing amide or sulphoxide groups, for example dimethylformamide or dimethyl sulphoxide, are known, for example, from U.S. Pat. No. 3,317,481. The nature of the solvents mentioned mitigates against use as an easy-to-handle adhesive since these solvents are pronounced high-boilers which remain for a long time in the adhesive film and are physiologically dangerous. Moreover, since they are aggressive solvents to many types of plastics, their use as an adhesive for plastics may cause a lasting swelling and deformation of the substrates to be bonded.

British Pat. No. 1,126,094 describes NCO prepolymers based on 4,4'-diisocyanato-diphenyl-methane, trifunctional, basic polyethers and conventional plasticizers. Adhesives based on such NCO prepolymers generally only have a very slight substrate adhesion, as shown by our own experiments. They are unsuitable for bonding conventional plastics, for example PVC of glass-reinforced polyester resin, because the adhesion of the adhesive film is not given on polyester-resin plastics mentioned.

German Auslegeschrift No. 1,922,626 describes NCO prepolymers based on basic polyethers and 2,4-diisocyanato-toluene. These NCO prepolymers are also unsuitable particularly as an adhesive for plastics for the above-mentioned reasons. Moreover, the use of diisocyanato-toluene requires additional measures due to the relatively high vapor pressure thereof, in order to reduce the content of this diisocyanate in the final product.

The leather lacquers based on NCO prepolymers described in published European Patent Application No. 15465 are equally unsuitable as a one-component adhesive, because the gel rate thereof is much too slow even in the presence of atmospheric moisture.

An object of the present invention is to provide new one-component systems which meet the above-mentioned practical requirements with respect to physiological safety, storage stability and gel time. This object may be achieved using the mixtures according to the present invention which is described in more detail below.

SUMMARY OF THE INVENTION

The present invention provides a mixture which is stable in storage in the absence of moisture, comprising the following:

(a) 100 parts by weight, of polyurethane prepolymers, containing from about 0.1 to 0.5%, by weight, of incorporated tertiary nitrogen atoms, from about 3 to 15%, by weight, of structural units corresponding to the following formula:

in polyester chains, and from about 3 to 12%, by weight, of terminal isocyanate groups, which polyurethane prepolymers are obtained by reacting:

(a1) polyisocyanates or polyisocyanate mixtures of the diphenyl-methane series with mixtures of (a2) at least one linear or slightly branched polyester polyol having an OH number of from about 50 to 250 and containing neopentyl glycol condensed therein and, optionally, at least one linear or slightly branched polyester polyol having an OH number of from about 50 to 250 and not containing neopentyl glycol condensed therein, (a3) di- or tri-functional polyhydroxypolyethers having an OH number of from about 56 to 500, containing tertiary amino nitrogen atoms and optionally in admixture with neutral, di- or tri-functional polyhydroxy polyethers having an OH number of from about 28 to 500, and optionally, (a4) di- or tri-hydric alcohols having an OH number of from about 500 to 1810, wherein the NCO:OH equivalent ratio is from about 1.7:1 to 5:1

(b) from about 3 to 25 parts, by weight, of at least one phosphoric acid ester corresponding to the following general formula:

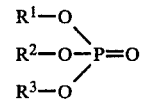

wherein
$R^1$, $R^2$ and $R^3$, which may be the same or different, each represent a phenyl radical which may be substituted by $C_1$-$C_{12}$ alkyl, or a saturated aliphatic hydrocarbon radical having from 6 to 18 carbon atoms; and (c) from about 5 to 50 parts, by weight, of one or more inert solvents having a boiling point of from 40° to 140° C.

The present invention also provides the use of these mixtures as adhesives for bonding various flexible or rigid substrates.

Furthermore, the present invention provides the use of these mixtures as coatings for various flexible or rigid substrates.

DETAILED DESCRIPTION OF THE INVENTION

The mixtures according to the present invention comprises components (a), (b) and (c) and optionally (d) other auxiliaries and additives known in commercial polyurethane chemistry.

Component (a) of the mixtures according to the present invention comprises prepolymers having terminal isocyanate groups and having the above-mentioned content of incorporated tertiary amino nitrogen atoms, structural units corresponding to the following formula:

$$-O-CH_2-C(CH_3)_2-CH_2-O-$$

and isocyanate groups. The preferred NCO prepolymers contain from about 0.2 to 0.4%, by weight, of incorporated tertiary amino nitrogen atoms, from about 4 to 10%, by weight, of structural units corresponding to the above-mentioned formula and from about 6 to 10% of isocyanate groups. The content of tertiary nitrogen atoms may be determined, for example, titrimetrically after blocking the isocyanate groups, for example using ethanol. The content of structural units corresponding to the above-mentioned formula may be determined, for example, by gas chromatographic analysis of the hydrolysate of the prepolymers. The NCO content which may be determined titrimetrically in a known manner must be corrected due to the content of nitrogen which is simultaneously determined during the NCO titration (dibutylamine method).

The prepolymers having isocyanate groups are prepared in a known manner by reacting the above-mentioned components (a1), (a2), (a3) and, optionally (a4).

The component (a1) comprises polyisocyanates or polyisocyanate mixtures of the diphenyl-methane series, i.e. 4,4'- and/or 2,4'-diisocyanato-diphenyl-methane or mixtures of these isomers with higher homologues thereof, as they are obtained in a known manner by the phosgenation of aniline/formaldehyde condensates. Polyisocyanates of the type mentioned which are modified in a known manner by a reaction with low molecular weight glycols or by partial carbodiimidization, in particular 4,4'-diisocyanato-diphenyl-methane liquefied in such a manner, are suitable as component (a1). The term "polyisocyanates or polyisocyanate mixtures of the diphenyl-methane series" should thus also include such modified products.

The component (a2) comprises polyesters or polyester mixtures containing neopentyl glycol condensed therein, and when polyester mixtures are used, at least one component must contain neopentyl glycol condensed therein in such a quantity that the above-mentioned conditions are met with respect to the content of structural units corresponding to the formula mentioned. Moreover, the polyesters (a2) are linear or slightly branched polyester polyols having an OH number of from about 50 to 250, preferably from about 56 to 224.

Polyester polyols of this type are prepared according to known methods from polyhydric carboxylic acids or carboxylic anhydrides, preferably dicarboxylic acids or dicarboxylic acid anhydrides, for example succinic acid, adipic acid, sebacic acid, phthalic acid, phthalic acid anhydride, isophthalic acid, maleic acid, maleic acid anhydride and hexahydrophthalic acid anhydride, and polyhydric, preferably dihydric, alcohols having a molecular weight of from about 62 to 200, for example ethylene glycol, 1,2-dihydroxy-propane, 1,3-dihydroxy-propane, 1,4-dihydroxy-butane, neopentyl glycol, 1,6-dihydroxy-hexane, glycerine and/or trimethylolpropane. 1,6-dihydroxyhexane, is a particularly preferred alcoholic synthesis component for the polyester polyols, in addition to the neopentyl glycol which is essential for the purposes of the present invention. During the preparation of the polyester polyols, polyhydric alcohols, such as glycerin or trimethylolpropane, are used in quantities of up to about 30 hydroxyl equivalent %, based on the total quantity of the alcohols to be used. During the preparation of the polyester polyols, the alcoholic synthesis components are naturally used in excess with respect to the acids or acid anhydrides. Polyester polyols based on adipic acid and meeting the above requirements are particularly preferred.

The components (a3) are di- and/or tri-functional polyhydroxy polyethers containing tertiary nitrogen atoms, having OH numbers of from about 56 to 500, preferably from about 112 to 224, which may optionally be used together with nitrogen-free polyether polyols having an OH number of from about 28 to 500, preferably from about 56 to 500. Polyether polyols of this type are prepared in a known manner by alkoxylating suitable starting materials, for example ammonia, methylamine, ethylamine, N-methyl-diethanolamime, ethanolamine, propanolamine, or in the case of the nitrogen-free polyether polyols, for example, water, ethylene glycol, 1,2-dihydroxy-propane or trimethylolpropane, using alkylene oxides, such as ethylene oxide and, in particular, propylene oxide or mixtures of such alkylene oxides.

Polyether polyols (a3) which are preferred are the corresponding propoxylation products of the exemplified starting materials.

During the preparation of the prepolymers (a) containing isocyanate groups, low molecular weight di- and tri-functional alcohols having an OH number of from about 500 to 1810 may also be simultaneously used as other synthesis components, for example, ethylene glycol, propylene glycol, diethylene glycol, tripropylene glycol, N-methyl-diethanolamine or trimethylolpropane, in quantities of up to about 30 hydroxyl equivalent %, although this is less preferred.

The prepolymers (a) containing isocyanate groups are generally prepared such that mixtures of the synthesis components (a2), (a3) and, optionally, (a4) are reacted with the polyisocyanate component (a1) which is used in excess, i.e. while observing an NCO/OH equivalent ratio of from about 1.7:1 to 5:1, preferably from about 2.5:1 to 3.5:1, at from about 40° to 70° C.

The components (b) of the mixtures according to the present invention are phosphoric acid esters corresponding to the above-mentioned general formula, wherein the radicals $R^1$, $R^2$ and $R^3$ are as defined above. The phosphoric acid esters corresponding to the above general formula which are preferably used are those wherein the radicals mentioned are the same or different and in each case represent an optionally methyl-substituted phenyl radical or a saturated aliphatic hydrocarbon radical having from 6 to 10 carbon atoms.

The following, for example, are included as particularly well suited phosphoric acid esters: triphenyl phosphate, diphenyl-octyl phosphate, diphenyl-cresyl phosphate, trihexyl phosphate or trioctyl phosphate, wherein the octyl radical present in these compounds is preferably a 2-ethyl-hexyl radical.

From about 3 to 25 parts, by weight, preferably from about 5 to 15 parts, by weight, per 100 parts by weight of component (a), of component (b) are generally present in the mixtures according to the present invention.

The components (c) are solvents having a boiling point of from about 40° to 140° C., preferably from about 60° to 130° C., which are inert to isocyanate groups. Examples of such solvents include the following: acetonitrile, methylene chloride, toluene, xylene, methyl ethyl ketone or methyl isobutyl ketone, glycol monomethyl ether acetate, dimethoxy ethane, acetic acid ethyl ester or acetic acid butyl ester. Toluene, acetic ester and methyl ethyl ketone are preferred for the purposes of the present invention. Mixtures of such solvents may, of course, also be used.

From about 5 to 50 parts, by weight, preferably from about 5 to 30 parts, by weight, more preferably from about 10 to 20 parts, by weight, per 100 parts by weight of component (a), of component (c) (solvent) are generally present in the mixtures according to the present invention.

In addition to these components (a), (b) and (c) which are essential to the present invention, the present mixtures may also contain various auxiliaries and additives which are known in polyurethane chemistry. Examples of such auxiliaries and additives include fillers, pigments, flow aids and the like.

The mixtures according to the present invention may be prepared, for example, by mixing the individual components, However, one particularly appropriate practical example of preparing the mixtures comprises mixing the polyisocyanate component (a1) with the phosphoric acid ester (b) and the solvent (c) and, at room temperature and with stirring, adding the polyol components (a2) to (a4) separately or in any sequence. During this procedure, all the components are preferably used in anhydrous form (water content less than about 0.1%, by weight) which is conventional for reactions with isocyanates. The reaction mixture is stirred for from about 30 to 60 minutes at from about about 40° to 70° C. with the exclusion of moisture (dry tube) until the calculated NCO content is obtained or is not quite obtained. The NCO prepolymer solutions which are cooled are then drawn off into barrels protected from moisture and in this form they are stable in storage and ready for use.

The mixtures according to the present invention generally have a viscosity of from about 1,000 to 20,000 mPa.s, preferably from about 3,000 to 6,000 mPa.s. at 25° C. The most appropriate viscosity for the respective use may easily be adjusted by the quantity of solvent. The mixtures according to the present invention may be processed by conventional application techniques, for example, by means of a brush or spatula or by spraying. They are suitable as coating agents for the production of coatings on various flexible or rigid substrates, for example, such substrates based on metals, wood or plastics, and are particularly suitable as adhesives for bonding such substrates. The mixtures according to the present invention are particularly well suited for bonding PVC, plastics based on glass-reinforced polyester resins, polycarbonate, styrene/maleic acid anhydride copolymers or polypropylene. It is also possible to bond plastics parts to metals using the mixtures according to the present invention.

Due to the content of phosphoric acid esters of the type required according to the present invention, the storage stability of the present mixtures is increased quite considerably without excessively prolonging the gel times. In spite of the high storage stability of the mixtures according to the present invention, coatings having a layer thickness of from about 0.1 to 0.5 mm harden rapidly in the presence of atmospheric moisture at room temperature, so that after a short airing time of from about 5 to 15 minutes and after a contact pressure lasting only from about 15 to 30 minutes, bonds having an excellent shearing resistance are obtained.

Thus, the mixtures according to the present invention are particularly valuable, easy-to-handle one-component adhesives suitable, for example, for series bonding of different plastics parts in the motor industry.

In the following Examples, all the percentages are based on weight.

EXAMPLE 1

This Example illustrates the preparation of a mixture according to the present invention and the use thereof as an adhesive.

1875 parts, by weight, of freshly distilled 4,4'-diisocyanato-diphenyl-methane are mixed with 538 parts, by weight, of toluene and 268 parts, by weight, of tris-(2-ethyl-hexyl)-phosphate. The following are successively introduced into this mixture with stirring: 1,000 parts, by weight, of a hydroxyl polyester of adipic acid, 1,6-dihydroxy hexane and neopentyl glycol (weight ratio of the diols: 1.9:1) having an OH number of 56; 550 parts, by weight of propoxylated bisphenol A having an OH number of 200; and 1140, parts by weight, of propoxylated triethanolamine having an OH number of 147. After a reaction time of 40 minutes at from 50 to 60° C., a mixture according to the present invention is obtained having a viscosity of about 14,000 mPa.s at room temperature. The mixture is immediately drawn off into barrels protected from moisture and is unchanged in such barrels even after being stored for 6 months. The NCO prepolymer which is present in the mixture contains 4.0% of structural units corresponding to the following formula:

0.31% of tertiary amino nitrogen atoms and 8.2% of isocyanate groups.

In order to test the adhesive properties of the thus-prepared mixture, test plates which have not been pretreated and are based on glass-reinforced polyester resin (30% glass content) having dimensions of $2 \times 4 \times 0.3$ cm are coated and after 5 minutes are put together such that there is an overlapping surface of 2 cm$^2$, one of the surfaces in contact having been previously coated. The test bodies are then pressed together at a pressure at 30 kp/cm$^2$ for the time specified below. The shearing resistance is determined in a tension test machine having a spindle advance of 100 mm/min. This test is carried out immediately after the pressing procedure.

Shearing resistance after:

| | |
|---|---|
| 15 min. | 1.5 N/mm$^2$ |
| 30 min. | 2.4 N/mm$^2$ |
| 60 min. | 3.0 N/mm$^2$ |
| 24 h | 7.0 N/mm$^2$ |

The film drying is tested such that a film which is 0.5 mm thick is drawn on a glass plate and the time at which the adhesive surface is non-tacky is determined manually.

Film drying:
Non-tacky film after 30 minutes.

COMPARATIVE EXAMPLE 1

This Example illustrates the improvement in the storage stability by adding the phosphoric acid esters mentioned.

All the procedural steps which were carried out in Example 1 are repeated, with the exception that the mixture is prepared without the specified addition of trioctyl phosphate. In this Example, the following observations are made: streaks and visible gel particles form during the cooling step of the NCO prepolymer solution which is still being stirred. When the solution is poured, a skin forms on the surface. The NCO prepolymer samples which are stored in the sealed barrels harden gradually.

EXAMPLE 2

This Example illustrates the preparation of a mixture according to the present invention and the use thereof as an adhesive.

1230 parts, by weight, of a polyisocyanate mixture of the diphenyl-methane series having an NCO content of 31% and a viscosity of 100mPa.s at 25° C. and consisting of about 60% by weight of dinuclear diisocyanates (mainly 4,4'-diisocyanatodiphenyl methane), about 25% by weight of trinuclear triisocyanates, about 10% by weight of tetranuclear tetraisocyanates and of about 5% by weight of polyisocyanates containing more than four isocyanate groups are mixed with 830 parts, by weight, of toluene. 365 parts, by weight, of diphenyl-cresyl-phosphate are then added. The following anhydrous, liquid or molten polyhydroxyl compounds are then added successively with stirring: 1270 parts, by weight, of a hydroxyl polyester based on adipic acid, 1,6-dihydroxy-hexane and neopentyl glycol (weight ratio of the glycols: 1.88:1) having an OH number of 66; 380 parts, by weight, of propoxylated triethanolamine having an OH number of 147; and 25 parts, by weight, of ethoxylated ethylamine having an OH number of 448. The mixture is stirred for 40 minutes at from 50° to 70° C. In this manner, a mixture according to the present invention is obtained which has a viscosity of 4,000 mPa.s at 25° C. The mixture is drawn off into barrels protected from moisture. The NCO prepolymer which is present in the mixture contains 8.3% of structural units corresponding to the following formula:

—O—CH$_2$—C(CH$_3$)$_2$—CH$_2$—O—, 0.21% of tertiary nitrogen atoms and 9.1% of isocyanate groups.

An adhesive test similar to Example 1 produces the following shearing resistances:

| 15 min. | 1.3 N/mm$^2$ |
|---|---|
| 30 min. | 3.1 N/mm$^2$ |
| 60 min. | 3.2 N/mm$^2$ |
| 24 h. | 7.7 N/mm$^2$ |

Film drying:
A non-tacky film after 20 minutes.

EXAMPLE 3

This Example also illustrates the preparation of a mixture according to the present invention and the use thereof as an adhesive.

1125 parts, by weight, of freshly distilled 4,4'-diisocyanato-diphenyl-methane are mixed with 326 parts, by weight, of toluene and 163 parts, by weight, of diphenyl-octyl phosphate. The following anhydrous liquid or molten polyhydroxyl compounds are added at room temperature to the stirred mixture: 430 parts, by weight, of the polyester containing hydroxyl groups based on adipic acid, 1,6-hexane-diol and neopentyl glycol according to Example 2; 400 parts, by weight, of a polyester containing hydroxyl groups based on isophthalic acid, adipic acid, hexane-diol and trimethylolpropane (27.4 hydroxyl equivalent % TMP) having an OH number of 140; and 760 parts, by weight, of propoxylated triethanolamine having an OH number of 147. The reaction mixture is stirred for 40 minutes at from 50° to 60° C. The resulting mixture according to the present invention has a viscosity of 17,000 mPa.s at 25° C. It is drawn off into a barrel and may be stored, unchanged, for 6 months with the exclusion of moisture.

The NCO prepolymer which is present in the mixture contains 3.0% of structural units corresponding to the following formula:

—O—CH$_2$—C(CH$_3$)$_2$—CH$_2$—O—, 0.34% of tertiary nitrogen atoms, and 8.5% of isocyanate groups. The mixture may be diluted to spray viscosity by adding more solvent. As described in Example 1, the following properties are established:

Shearing resistance after:

| 15 min. | 1.7 N/mm$^2$ |
|---|---|
| 30 min. | 2.2 N/mm$^2$ |
| 60 min. | 2.7 N/mm$^2$ |
| 24 h | 5.0 N/mm$^2$ |

Film drying:
A non-tacky film after 40 minutes.

EXAMPLE 4

This Example illustrates the preparation of a mixture according to the present invention which is well suited as an adhesive for PVC.

875 parts, by weight, of freshly distilled 4,4'-diisocyanato-diphenyl-methane are mixed with 357 parts, by weight, of toluene and 100 parts, by weight, of trioctyl phosphate. The following anhydrous, liquid or molten polyhydroxyl compounds are added with stirring: 250 parts, by weight, of a hydroxyl polyester of adipic acid and neopentyl glycol having an OH number of 224; 380 parts, by weight, of propoxylated triethanolamine having an OH number of 147; and 420 parts, by weight, of a polyhydroxy polyester based on adipic acid and 1,6-dihydroxy-hexane having an OH number of 133. The mixture is stirred for 1 hour at from 60° to 80° C. 2382 parts, by weight, of a pale yellow colored mixture according to the present invention is obtained having a viscosity of 20,000 mPa.s at 25° C. The mixture is ready for use in this form or optionally after adding more solvent. The NCO prepolymer which is present in the mixture contains 7.5% of structural units corresponding to the following formula:

—O—CH$_2$—C(CH$_3$)$_2$—CH$_2$—O—, 0.24% of tertiary nitrogen atoms and 8.7% of isocyanate groups. The peeling resistance on PVC test material is tested according to DIN 53 273. Strips 3 cm wide of a PVC film 4 mm thick which contains 30 parts, by weight, of dioctyl-phthalate as a plasticizer are used as test bodies. The bodies are put together for 15 minutes after applying the adhesive and are pressed at a pressure of 0.4 N/mm$^2$ for 24 hours. The peeling resistance is determined in a tension test machine having a spindle advance of 100 mm/min.

Peeling resistance:

8.3 N/mm with the material tearing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is stable in storage in the absence of moisture comprising the following:
    (a) 100 parts, by weight, of polyurethane prepolymers containing from about 0.1 to 0.5%, by weight, of incorporated tertiary nitrogen atoms, from about 3 to 15%, by weight, of structural units positioned in polyester chains corresponding to the following formula:

—O—CH$_2$—C(CH$_3$)$_2$—CH$_2$—O— and from about 3 to 12%, by weight, of terminal isocyanate groups which are obtained by reacting:
    (a1) polyisocyanates or polyisocyanate mixtures of the diphenyl-methane series with mixtures comprising:
    (a2) at least one linear or slightly branched polyester polyol having an OH number of from about 50 to 250 containing neopentyl glycol condensed therein and optionally, at least one linear or slightly branched polyester polyol having an OH number of from about 50 to 250 not containing neopentyl glycol condensed therein,
    (a3) di- or tri-functional polyhydroxy polyethers having an OH number of from about 56 to 500, containing tertiary amino nitrogen atoms, and optionally in admixture with neutral, di- or tri-functional polyhydroxy polyethers having an OH number of from about 28 to 500, and, optionally,
    (a4) di- or tri-hydric alcohols having an OH number of from about 500 to 1810 wherein the NCO:OH equivalent ratio is from about 1.7:1 to 5:1.
    (b) from about 3 to 25 parts, by weight, of at least one phosphoric acid ester corresponding to the following general formula:

$$\begin{array}{c} R^1-O \\ R^2-O-P=O \\ R^3-O \end{array}$$

wherein
    R$^1$, R$^2$ and R$^3$, which may be the same or different, each represents an optionally C$_1$-C$_{12}$ alkyl-substituted phenyl radical or a saturated aliphatic hydrocarbon radical having from 6 to 18 carbon atoms; and
    (c) from about 5 to 50 parts, by weight, of one or more inert solvents having a boiling point of from about 40° to 140° C.

2. A process for binding flexible or rigid substrates with an adhesive which hardens under the influence of moisture wherein the adhesive comprises the composition of claim 1.

3. A process for coating flexible or rigid substrates with a coating agent which hardens under the influence of moisture wherein said coating agent comprises the composition of claim 1.

* * * * *